United States Patent
Chiu et al.

(10) Patent No.: US 11,126,299 B2
(45) Date of Patent: Sep. 21, 2021

(54) METHOD FOR RECOGNIZING MULTIPLE CAPACITIVE STYLUSES, TOUCH CONTROL UNIT, TOUCH PANEL AND SYSTEM

(71) Applicant: Infovision Optoelectronics (Kunshan) Co., LTD., Suzhou (CN)

(72) Inventors: Fengching Chiu, Suzhou (CN); Pengfei Wang, Suzhou (CN)

(73) Assignee: INFOVISION OPTOELECTRONICS (KUNSHAN) CO., LTD., Suzhou (CN)

( * ) Notice: Subject to any disclaimer, the term of this patent is extended or adjusted under 35 U.S.C. 154(b) by 0 days.

(21) Appl. No.: 16/965,012

(22) PCT Filed: Mar. 8, 2018

(86) PCT No.: PCT/CN2018/078411
§ 371 (c)(1),
(2) Date: Jul. 26, 2020

(87) PCT Pub. No.: WO2019/169599
PCT Pub. Date: Sep. 12, 2019

(65) Prior Publication Data
US 2021/0055861 A1 Feb. 25, 2021

(51) Int. Cl.
*G06F 3/041* (2006.01)
*G06F 3/0354* (2013.01)
*G06F 3/044* (2006.01)

(52) U.S. Cl.
CPC .... *G06F 3/041662* (2019.05); *G06F 3/03545* (2013.01); *G06F 3/044* (2013.01);
(Continued)

(58) Field of Classification Search
CPC .......... G06F 3/04186; G06F 3/3545; G06F 2203/04104; G06F 2203/04106; G06F 3/041662
See application file for complete search history.

(56) References Cited

U.S. PATENT DOCUMENTS

| | | | |
|---|---|---|---|
| 2007/0152976 A1* | 7/2007 | Townsend | G06F 3/016 345/173 |
| 2010/0328262 A1* | 12/2010 | Huang | G06F 3/04186 345/174 |

(Continued)

FOREIGN PATENT DOCUMENTS

| | | |
|---|---|---|
| CN | 101887336 A | 11/2010 |
| CN | 102023768 A | 4/2011 |

(Continued)

*Primary Examiner* — Michael Pervan
(74) *Attorney, Agent, or Firm* — Cheng-Ju Chiang

(57) ABSTRACT

The present invention discloses a method for recognizing multiple active capacitive styluses, a touch control unit, a touch panel, and a touch system. The method includes the steps of: obtaining recognition signals sent by multiple active capacitive styluses, and recognizing coordinates of each active capacitive stylus and its report point removing ghost point coordinates from the report point coordinates in a mutual capacitive mode of a work cycle of a touch panel, to obtain actual coordinates of each active capacitive stylus. The present invention accurately recognizes the specific positions of the multiple active capacitive styluses by eliminating the coordinates of the ghost points and has the advantages of high positioning accuracy and strong user experience.

4 Claims, 5 Drawing Sheets

(52) U.S. Cl.
CPC .................. *G06F 3/04186* (2019.05); *G06F 2203/04104* (2013.01); *G06F 2203/04106* (2013.01)

(56) References Cited

U.S. PATENT DOCUMENTS

| | | |
|---|---|---|
| 2014/0146007 A1 | 5/2014 | Lee et al. |
| 2015/0009175 A1 | 1/2015 | Berget et al. |

FOREIGN PATENT DOCUMENTS

| | | |
|---|---|---|
| CN | 102043500 A | 5/2011 |
| CN | 102214033 A | 10/2011 |
| CN | 104077001 A | 10/2014 |
| JP | 2012-22543 A | 2/2012 |
| JP | 2013-515302 A | 5/2013 |
| JP | 2016-62205 A | 4/2016 |
| JP | 2017-174352 A | 9/2017 |
| JP | 2017-536631 A | 12/2017 |
| TW | 201535225 A | 9/2015 |
| TW | 201621563 A | 6/2016 |
| TW | 201635099 A | 10/2016 |

\* cited by examiner obtaining recognition signals sent by multiple active capacitive pens, and recognizing coordinates of each active capacitive pen and its report point — S11 removing ghost point coordinates from the report point coordinates in a mutual capacity mode of a duty cycle of a touch panel, to obtain actual coordinates of each active capacitive pen. — S12

METHOD FOR RECOGNIZING MULTIPLE CAPACITIVE STYLUSES, TOUCH CONTROL UNIT, TOUCH PANEL AND SYSTEM

CROSS REFERENCE TO RELATED APPLICATIONS

This application is a 35 U.S.C. § 371 National Phase conversion of International (PCT) Patent Application No. PCT/CN2018/078411, filed on Mar. 8, 2018, submitted by Infovision Optoelectronics (Kunshan) Co., Ltd., entitled "METHOD FOR RECOGNIZING MULTIPLE CAPACITIVE STYLUSES, TOUCH CONTROL UNIT, TOUCH PANEL AND SYSTEM". The contents of the above-identified applications are incorporated herein by reference. The PCT International Patent Application was filed and published in Chinese.

FIELD OF THE INVENTION

The present invention relates to touch control technology, and particularly to a method for recognizing multiple active capacitive styluses, a touch control unit, a touch panel, and a touch control system.

BACKGROUND OF THE INVENTION

Due to the advantages of easy to operate and high sensitivity, capacitive touch screens have become the first choice for touch devices. Capacitive screens used in capacitive touch screens are generally made by producing metal mesh conductive materials in glass or other transparent materials to form conductive electrode layers with criss-cross structures. These conductive electrodes can be used as transmit electrodes and receive electrodes. When a finger clicks on the screen, it will form a coupling capacitor with the transmit electrodes and the receive electrodes, and absorb a part of the current from the contact point, thereby causing a signal change of the transmit electrodes. That is, when the capacitive touch screen is touched by a conductor, the touch position of the conductor on the capacitive screen can be detected by detecting the change in the electric field formed by a conductive film, to realize a human-computer interaction function.

The touch screen may allow a user to perform various functions through touching the touch panel by a finger, a stylus pen, or other objects. Advanced touch screens can detect multiple touches simultaneously. Generally, the touch screen can recognize the location of one or more touches on the touch panel, then, the computing system can interpret the touch individually or interpret the touch as a single gesture according to a display content being generated when the touch event occurs, and then perform one or more actions according to the touch events.

When a stylus pen is used as an input device in a capacitive touch system, the stylus pen has properties similar to fingers. A conventional stylus pen is usually a conductive rod with a finger-sized round tip which is large enough to interrupt the electric field line between the transmit electrode and the receive electrode of the capacitive touch sensor panel. Therefore, the conventional stylus pen is a passive input device, that is, a passive capacitive stylus, because this kind of device cannot actively transmit an excitation signal or sense a capacitance change caused by a touch in a capacitive touch sensor panel.

As a capacitive stylus used in conjunction with a capacitive touch screen, the active capacitive stylus is equipped with a power supply and a corresponding control circuit, and could actively transmit signals. Compared with a passive capacitive stylus that can only receive signals, it has a thin tip and high positioning accuracy, could interact and has other advantages. Compared with writing by finger, writing by capacitive stylus is more in line with people's habits of using pens as input tools.

The problem with the prior art is that when multiple active capacitive styluses work on the capacitive touch screen simultaneously, the capacitive touch screen can recognize the multiple active capacitive styluses, but cannot identify specific locations of the multiple active capacitive styluses.

Problem of the Technology

When multiple active capacitive styluses work on the capacitive touch screen simultaneously, the capacitive touch screen can recognize the multiple active capacitive styluses, but cannot identify specific locations of the multiple active capacitive styluses.

Solution of the Technology

The main object of the present invention is to provide a method for recognizing multiple active capacitive styluses, a touch control unit, a touch panel, and a touch system, aiming to solve the positioning problem in the prior art that multiple active capacitive styluses cannot be identified.

In order to achieve the above object, a first aspect of the embodiments of the present invention provides a method for recognizing multiple active capacitive styluses. The method includes the steps of:

Obtaining recognition signals sent by multiple active capacitive styluses, and recognizing coordinates of each active capacitive stylus and its report point;

Removing ghost point coordinates from the report point coordinates in a mutual capacitive mode in a work cycle of the touch panel, to obtain actual coordinates of each active capacitive stylus.

In addition, in order to achieve the above object, a second aspect of the embodiments of the present invention provides a touch control unit, the touch control unit includes a recognition module and a removal module;

The recognition module is used for obtaining recognition signals sent by multiple active capacitive styluses, and recognizing coordinates of each active capacitive stylus and its report point;

The removal module is used for removing ghost point coordinates from the report point coordinates in the mutual capacitive mode of the touch panel, to obtain actual coordinates of each active capacitive stylus.

In addition, in order to achieve the above object, a third aspect of the embodiments of the present invention provides a touch panel on which a capacitive stylus can perform touch operations. The touch panel includes the above-mentioned touch control unit, a transmit electrode, and a receive electrode.

The touch panel is used for receiving recognition signals sent by multiple active capacitive styluses according to a control signal of the touch control unit through the transmit electrode and the receive electrode.

Furthermore, in order to achieve the above object, a fourth aspect of the embodiments of the present invention provides a touch system, the touch system includes multiple active capacitive styluses and the above-mentioned touch panel.

Beneficial Effect

The method for identifying multiple active capacitive styluses, the touch control unit, the touch panel and the touch system provided by embodiments of the present invention can accurately identify specific positions of the multiple active capacitive styluses by excluding ghost point coordinates, and have the advantages of high positioning accuracy and strong user experience.

Figure 1:
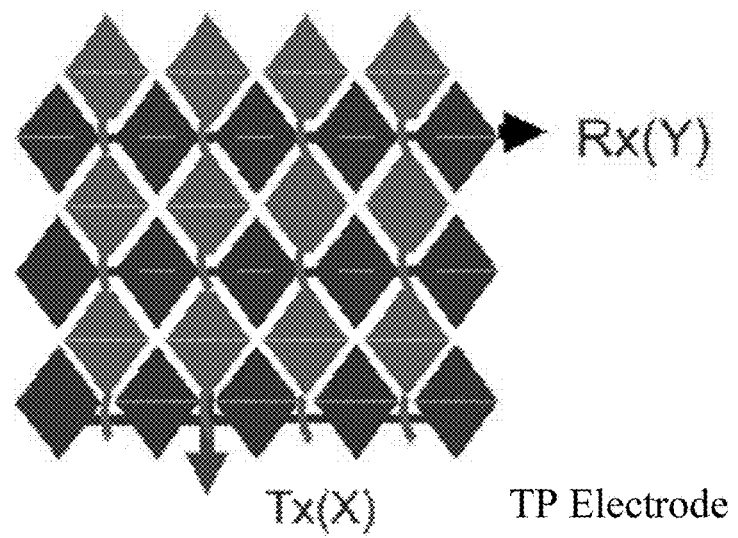
FIG. 1 is a schematic, structural diagram showing electrodes of a touch panel according to an embodiment of the present invention.

The implementation, functional characteristics and advantages of the present invention will be further described in conjunction with the embodiments and with reference to the drawings.

DETAILED DESCRIPTION OF PREFERRED EMBODIMENTS

The present invention will be described in more detail below with reference to the drawings. In the drawings, the same elements are labeled by similar reference numbers. For clarity, parts in the drawings are not drawn to scale. In addition, some well-known parts may not be shown in the drawings.

In order to understand the present invention more clearly, many specific details of the present invention are described hereinafter, such as the structures, materials, dimensions, treatment processes and techniques of the device. However, as can be understood by those skilled in the art, the present invention may not be implemented according to these specific details.

First Embodiment

Figure 2:
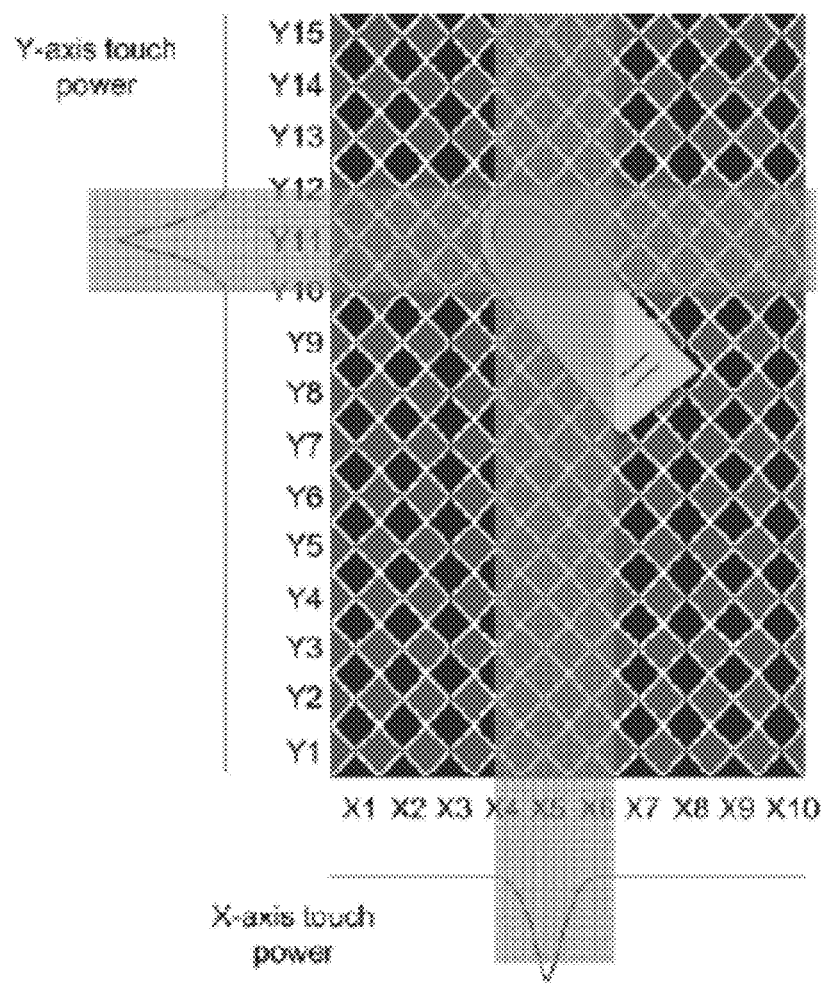
FIG. 2 is a schematic, structural diagram showing electrodes of a touch panel being touched according to an embodiment of the present invention.

Before describing this embodiment, the touch panel, the report point coordinates, and the ghost point coordinates will be described below with reference to FIGS. 1-3:

As shown in FIG. 1, the touch panel includes a plurality of transmit electrodes Tx and a plurality of receive electrode Rx mutually interleaved with the transmit electrodes, the receive electrodes Rx are arranged along a horizontal direction, the transmit electrodes Tx are arranged along a vertical direction, and a number of the transmit electrodes Tx and a number of the receive electrodes Rx are not limited.

The transmit electrode Tx and the receive electrode Rx are coupled with each other to form a mutual capacitance. As shown in FIG. 2, when a finger touches, a coupling capacitor is formed between the finger and a surface of the touch panel, this causes a slight fluctuation of the current, which is equivalent to a change in the mutual capacitance. By scanning the transmit electrodes Tx and the receive electrodes Rx, the change in the capacitance of the touch point can be detected, and the position of the finger can be calculated. In this mode, the transmit electrode Tx is used to transmit signals, and the receive electrode Rx is used to receive signals.

When the active capacitive stylus touches, the active capacitive stylus transmits a signal. At this time, the transmit electrode Tx and the receive electrode Rx on the touch panel simultaneously sense the transmitted signal of the active capacitive stylus on the X and Y axes, that is, the transmit electrode Tx and the receive electrode Rx on the touch panel both serve as receive electrodes at this time, and are used to sense the signal transmitted by the active capacitive stylus. As shown in FIG. 3, when two active capacitive styluses touch the touch panel simultaneously, the two active pens respectively transmit signals to the touch panel, the transmit electrode Tx and the receive electrode Rx of the touch panel both serve as receive electrodes at the same time. Since the two active capacitive styluses touch simultaneously, four electrodes will generate changes in the received signal, therefore, the two active capacitive stylus signals will generate four touch point coordinates, that is, the report point coordinates are (X1, Y1), (X2, Y1), (X1, Y2) and (X2, Y2), and the coordinates of the actual location of the two active capacitive styluses are (X1, Y1), (X2, Y2), therefore, there are ghost point coordinates (X2, Y1), (X1, Y2) in the point coordinates. Because the touch panel cannot accurately identify the actual positions of the two active capacitive styluses, the positionings of the two active capacitive styluses are inaccurate.

Figures 3, 4:
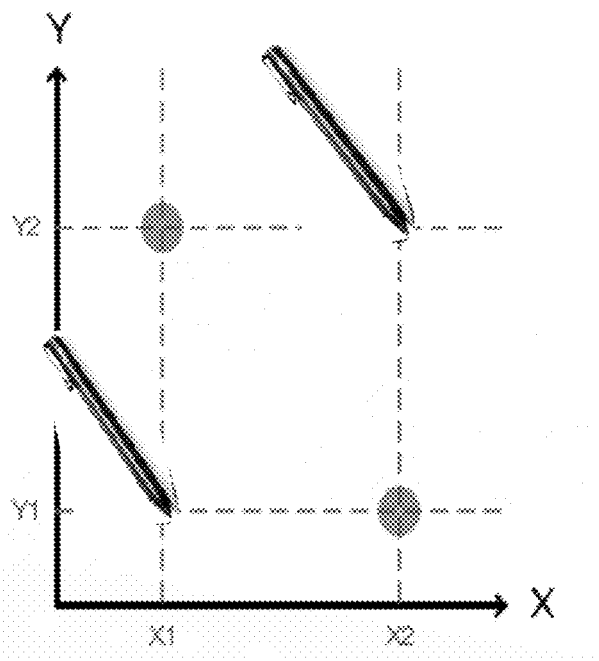
FIG. 3 is a schematic, structural diagram showing an active capacitive stylus and its coordinate according to an embodiment of the present invention.
FIG. 4 is a schematic flowchart of a method for recognizing active capacitive styluses according to a first embodiment of the present invention.

Based on the above problem of inaccurate positioning, as shown in FIG. 4, the first embodiment of the present invention provides a method for recognizing multiple active capacitive styluses. The method includes the following steps:

S11: obtaining recognition signals sent by multiple active capacitive styluses, and recognizing coordinates of each active capacitive stylus and its report point.

In this embodiment, since the operation mode of the active capacitive stylus is to transmit signals, and the corresponding operation mode of the touch panel is to receive signals (Rx, Rx), recognition signals sent by the active capacitive styluses can be obtained by controlling the transmit electrodes or the receive electrodes of the touch panel.

In this embodiment, the recognition signal is the identification code or ID (Identification) number of the active capacitive stylus.

S12: removing ghost point coordinates from the report point coordinates in the mutual capacitive mode of the work cycle of the touch panel to obtain the actual coordinates of each active capacitive stylus.

In this embodiment, since the multiple active capacitive styluses (equivalent to stylus tips) do not emit signals during this period, the corresponding operation mode of the touch panel is mutual capacitive mode, that is, it transmits and receives signals (Tx, Rx) simultaneously, in this process, the mutual capacitive mode of the touch panel can be used to remove the ghost point coordinates. The specific process of removing the ghost point coordinates is: firstly transmitting a signal to a transmit electrode Tx of the touch panel, and then receiving the signal through the receive electrode Rx of the touch panel, and so on, until all the transmit electrodes Tx have finished transmitting the signal; according to this, the ghost point coordinates in the report point coordinates can be eliminated and the coordinates of the actual position of each active capacitive stylus can be obtained.

Figure 8:
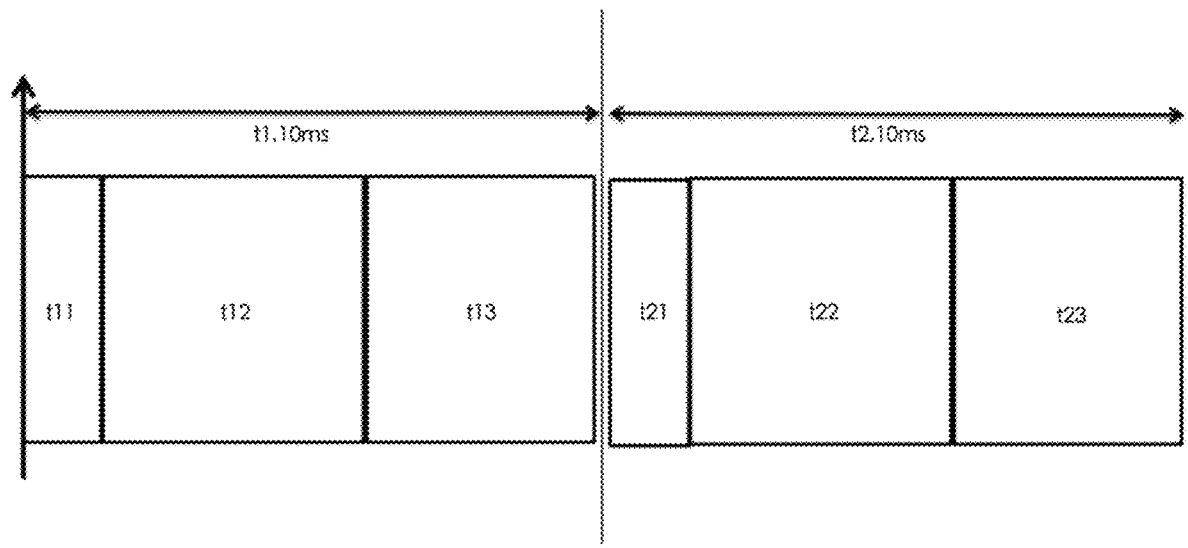
FIG. 8 is a schematic sequence diagram showing coordinate recognition according to an embodiment of the present invention.

As an example, suppose the report rate is 100 Hz (Hertz), and its work cycle is 1/100=10 ms (millisecond). Please refer to FIG. 8, t1 and t2 are two adjacent work cycles, and each work cycle is 10 ms. t11, t12, and t13 are three time periods of the work cycle t1, and t21, t22, and t23 are similar.

During the time period t11, it is mainly used to identify the ID number of the active capacitive stylus. For example: assuming that there are two active capacitive styluses, the model and the number of the active capacitive styluses can be determined in this period.

During the time period t12, two active capacitive styluses will generate four coordinates, wherein two coordinates are ghost point coordinates (refer to the previous description and FIG. 3 for details). During this time period, both the transmit electrode Tx and the receive electrode Rx of the touch panel are used to receive signals, and the two active capacitive styluses transmit signals.

During the time period t13, the two active capacitive styluses (equivalent to stylus tips) do not emit signals, the operation mode of the touch panel is the mutual capacitive mode, in the mutual capacitive mode, the transmit electrode Tx is used for transmitting signals, and the receive electrode Rx is used for receiving signal. The mutual capacitive mode of the touch panel can distinguish the finger and the passive capacitive stylus, because the changes of the original values (signal differences) of the finger and the passive capacitive stylus are different. During this period, when the active pen does not emit a signal (at this time, it can be regarded as a passive capacitive stylus), the mutual capacitive mode can detect the positions of the finger and the passive capacitive stylus and distinguish them, that is, distinguish the finger/the passive capacitive stylus (including the stylus tip). Except for the position of the stylus tip, the other positions are ghost points. Therefore, the ghost points can be eliminated during this time.

The work cycle t2 is similar to the work cycle t1. The difference is that the ID number of the active capacitive stylus may not be recognized during time period t21, and this time period can be omitted. The main reason is that, due to the suspension characteristics of the active pen, the writing of the active pen is continuous, the ID number of the active capacitive pen can be obtained through continuity algorithm of chip report point, and does not need to be identified again in the subsequent report period.

Figure 5:
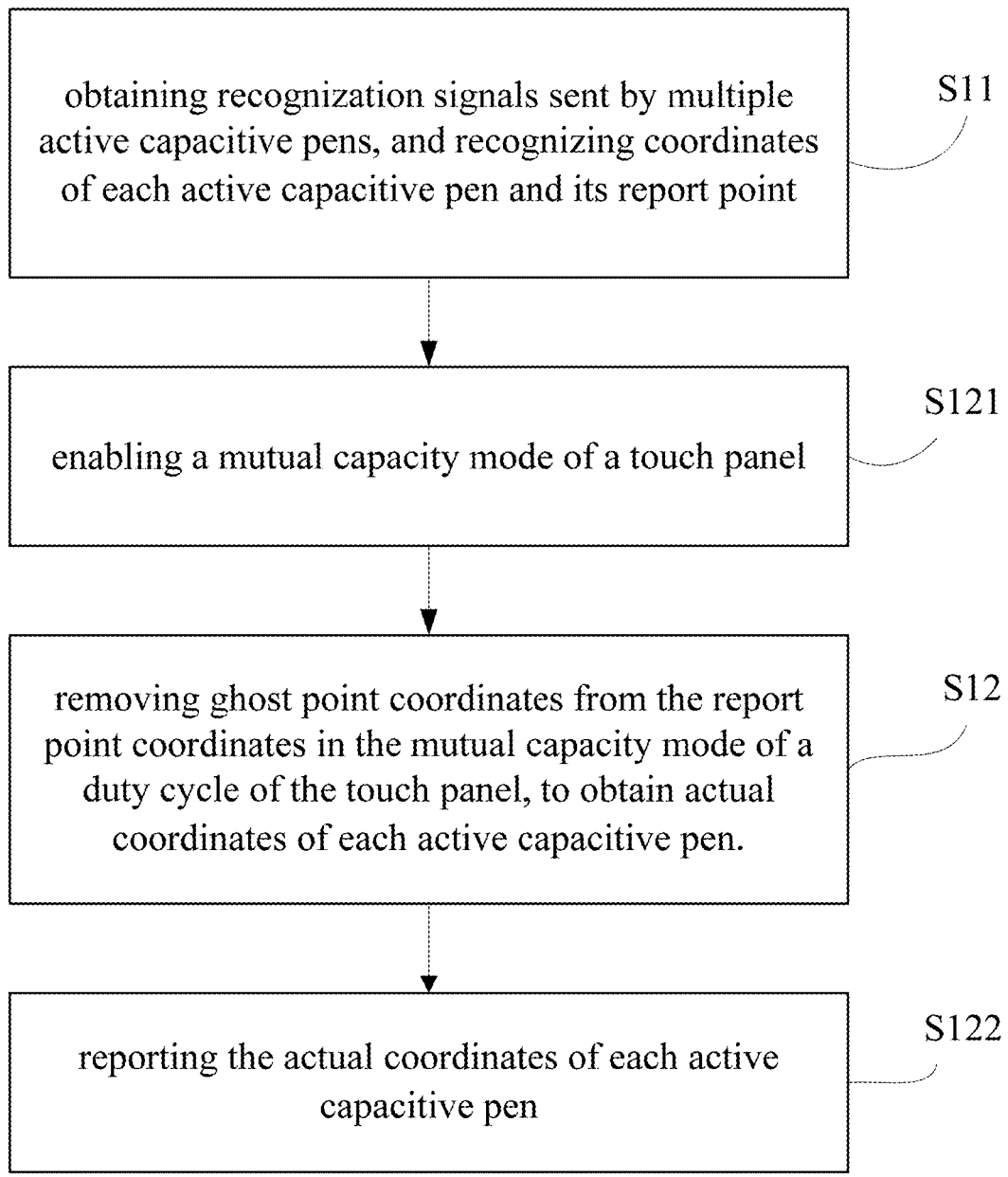
FIG. 5 is another schematic flowchart of a method for recognizing active capacitive styluses according to a first embodiment of the present invention.

Please refer to FIG. 5, in one embodiment, before the step of removing ghost point coordinates from the report point coordinates in the mutual capacitive mode of the touch panel to obtain the actual coordinates of each active capacitive stylus, the method further includes:

S121: enabling the mutual capacitive mode of the touch panel.

Please refer to FIG. 5 again, in an embodiment, after the step of removing ghost point coordinates from the report point coordinates in the mutual capacitive mode to obtain the actual coordinates of each active capacitive stylus, the method further includes:

S122: reporting the actual coordinates of each active capacitive stylus.

In this embodiment, in order to improve the accuracy of reporting, the active capacitive stylus may be identified in each report period.

In this embodiment, it can be recognized only when the active capacitive stylus touches. Because the stylus pen has a suspension characteristic, if the active capacitive stylus does not leave the touch panel, the writing of the stylus pen is continuous, the stylus pen can be identified by the continuity algorithm of chip report point, and does not need to be identified in the subsequent report period. If the active capacitive stylus leaves the touch panel or the distance between the active capacitive styluses is very close, the recognition of the active capacitive stylus can be enabled again. In this way, the report rate can be increased.

Figure 9:
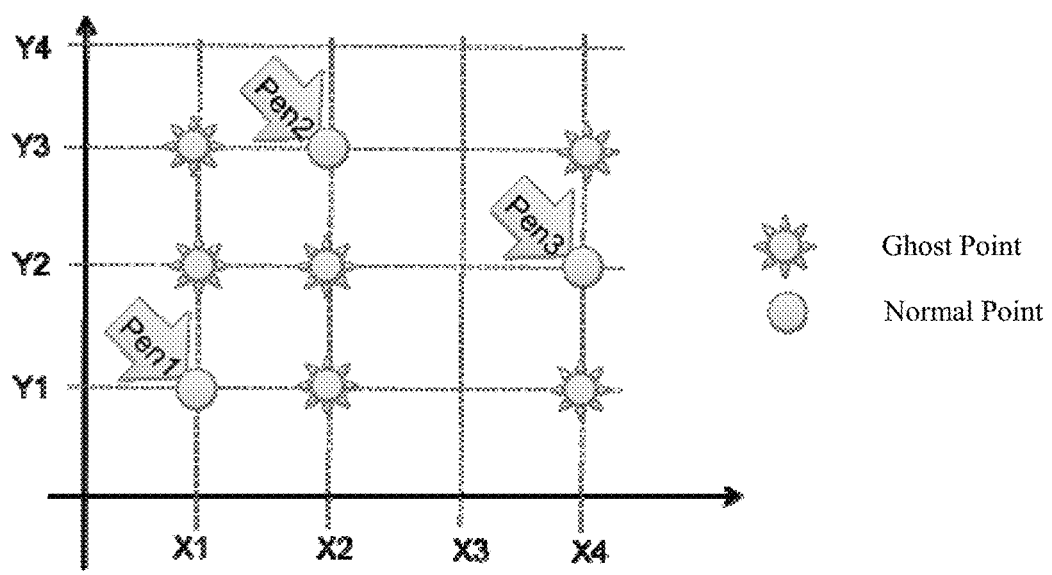
FIG. 9 is a schematic, structural diagram showing a coordinate recognition of multiple active capacitive styluses according to an embodiment of the present invention.

In order to further explain this embodiment, the following will take three active capacitive styluses as an example in conjunction with FIG. 9 for description:

As shown in FIG. 9, when three active capacitive styluses touch, the recognition signals sent by the three active capacitive styluses can be obtained by controlling the transmit electrodes or the receive electrodes of the touch panel, to identify the three active capacitive styluses respectively as Pen1, Pen2 and Pen3, and the report point coordinates are (X1, Y1), (X1, Y2), (X1, Y3), (X2, Y1), (X2, Y2), (X2, Y3), (X4, Y1), (X4, Y2) and (X4, Y3).

Scanning X1, X2, X3, and X4 in sequence, and receiving signals on Y1-Y4, and further removing the ghost point coordinates from the report point coordinates. The coordinates after removal are (X1, Y1), (X2, Y3), (X4, Y2), and the coordinates are the actual coordinates of Pen1, Pen2, and Pen3.

The method for recognizing multiple active capacitive styluses provided by the embodiments of the present invention accurately identifies the specific positions of the multiple active capacitive styluses by excluding the ghost point coordinates, and has the advantages of high positioning accuracy, and strong user experience.

Second Embodiment

Figure 6:
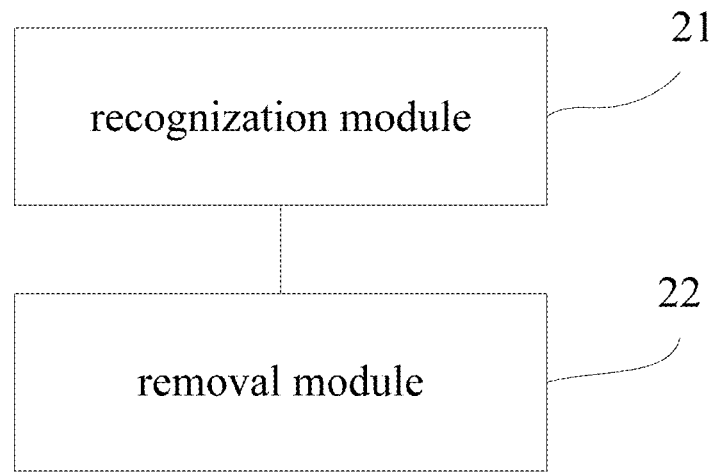
FIG. 6 is a schematic, structural diagram of a touch control unit according to a second embodiment of the present invention.

Referring to FIG. 6, FIG. 6 is a touch control unit according to a second embodiment of the present invention. The touch control unit includes a recognition module 21 and a removal module 22;

The recognition module 21 is used to obtain the recognition signals sent by multiple active capacitive styluses, and identify the coordinates of each active capacitive stylus and its report point.

In this embodiment, the recognition module 21 obtains the recognition signals sent by the multiple active capacitive styluses by controlling the transmit electrode or the receive electrode of the touch panel.

In this embodiment, the recognition signal is the identification code or ID (Identification) number of the active capacitive stylus.

The removal module 22 is used to remove the ghost point coordinates from the report point coordinates in the mutual capacitive mode of the work cycle to obtain the actual coordinates of each active capacitive stylus.

In this embodiment, since the active capacitive stylus (equivalent to the stylus tip) does not emit signal during this period, the corresponding touch panel works in a mutual capacitive mode, that is, it simultaneously transmits and receives signals (Tx, Rx). Therefore, in this process, the mutual capacitive mode of the touch panel can be used to remove the ghost point coordinates. The specific process of removing the ghost point coordinates is as follows: firstly transmitting a signal to a transmit electrode Tx of the touch panel, and then receiving the signal through the receive electrode Rx of the touch panel, and so on, until all the transmit electrodes Tx have finished transmitting the signal; according to this, the ghost point coordinates from the report point coordinates can be eliminated to obtain the coordinates of the actual position of each active capacitive stylus.

As an example, suppose the report rate is 100 Hz (Hertz), and its work cycle is 1/100=10 ms (millisecond). Please refer to FIG. 8, t1 and t2 are two adjacent work cycles, and each work cycle is 10 ms. t11, t12, and t13 are three time periods of the work cycle t1, and t21, t22, and t23 are similar.

During the time period t11, it is mainly used to identify the ID number of the active capacitive stylus. For example: assuming that there are two active capacitive styluses, the model and number of active capacitive styluses can be determined in this period.

During the time period t12, two active capacitive styluses will generate four coordinates, wherein two coordinates are ghost point coordinates (refer to the previous content and FIG. 3 for details). During this time period, both the transmit electrode Tx and the receive electrode Rx of the touch panel are used to receive signals, and two active capacitive styluses transmit signals.

During the time period t13, two active capacitive styluses (equivalent to stylus tips) do not emit signals, and the operation mode of the touch panel is the mutual capacitive mode. Since the transmit electrode Tx of the touch panel is used to transmit signals in the mutual capacitive mode, the receive electrode Rx is used to receive signals. The mutual capacitive mode of the touch panel can distinguish the finger and the passive capacitive stylus, because the changes of the original values (signal difference) of the finger and the passive capacitive stylus are different. During this period, when the active pen does not emit signal (at this time, it can be regarded as a passive capacitive stylus), the mutual capacitive mode can detect the position of the finger and the passive capacitive stylus and distinguish them, that is, distinguish the finger/passive capacitive stylus (including the stylus tip). Except for the position of the pen, other positions are ghost points. Therefore, ghost points can be eliminated during this time.

The work cycle t2 is similar to the work cycle t1. The difference is that the ID number of the active capacitive stylus may not be recognized during time period t21, and this time period can be omitted. The main reason is that, due to the suspension characteristics of the active pen, the writing of the active pen is continuous, and the active pen can be identified through continuity algorithm of the report chip point, and does not need to be identified again in the subsequent report period.

Figure 7:
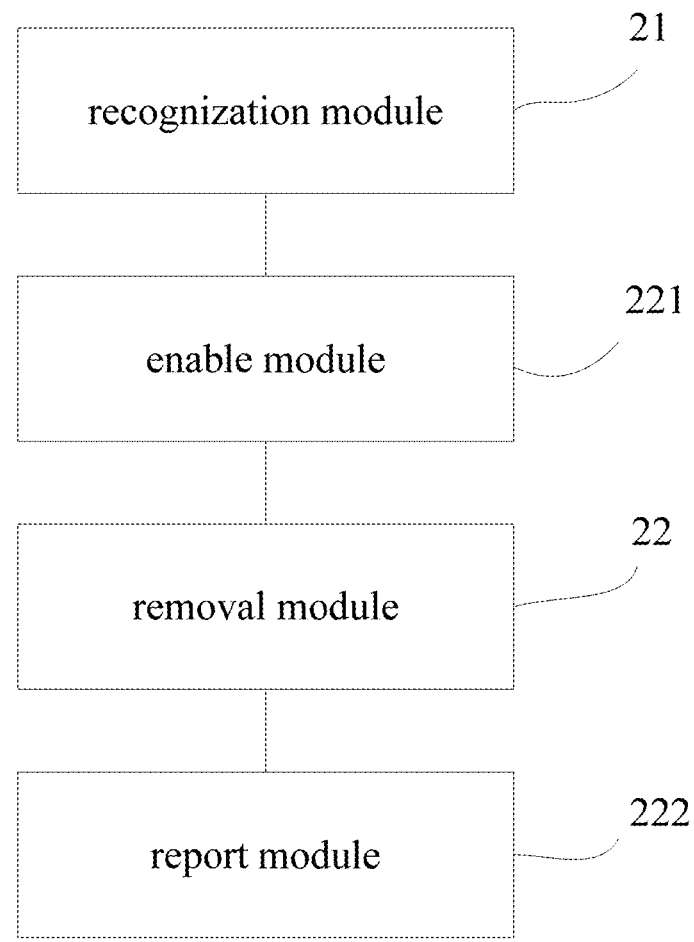
FIG. 7 is another schematic, structural diagram of a touch control unit according to a second embodiment of the present invention.

Please refer to FIG. 7 again, in an embodiment, the touch control unit further includes an enable module 221;

The enable module 221 is used to enable the mutual capacitive mode of the touch panel.

Please refer to FIG. 7 again, in an embodiment, the touch control unit further includes a report module 222;

The report module 222 is used to report the actual coordinates of each active capacitive stylus.

In this embodiment, in order to improve the accuracy of reporting, the active capacitive stylus can be identified in each report period.

In this embodiment, the identification can be performed only when the active capacitive stylus touches. If the capacitive stylus does not leave the touch panel, there is no identification requirement in the subsequent report period. If the capacitive stylus leaves the touch panel, or the distance between the active capacitive styluses is very close, the recognition of the active capacitive stylus can be enabled again. In this way, the report rate can be increased.

The touch control unit provided by the embodiment of the present invention accurately recognizes the specific positions where the multiple active capacitive styluses are actually located by eliminating the coordinates of the ghost points, and has the advantages of high positioning accuracy, and strong user experience.

Third Embodiment

A third embodiment of the present invention provides a touch panel on which a capacitive stylus can perform touch operations. The touch panel includes the touch control unit described in the second embodiment, a plurality of transmit electrodes and a plurality of receive electrodes.

The transmit electrode and the receive electrode are configured to receive recognization signals sent by multiple active capacitive styluses according to the control signal of the touch control unit.

The touch panel provided by the embodiment of the present invention accurately recognizes the actual locations of multiple active capacitive styluses by excluding the ghost point coordinates, and has the advantages of high positioning accuracy, and strong user experience.

Fourth Embodiment

A fourth embodiment of the present invention provides a touch system. The touch system includes multiple active capacitive styluses and the touch panel described in the third embodiment.

The touch system provided by the embodiment of the present invention accurately recognizes the specific positions where multiple active capacitive styluses are actually located by excluding the ghost point coordinates, and has the advantages of high positioning accuracy, and strong user experience.

It should be noted that in this article, relational terms such as first and second are used only to distinguish one entity or operation from another entity or operation, and do not necessarily require or imply that there is any such actual relationship or order between these entities or operations. Moreover, the terms "include", "have" or any other variant thereof are intended to cover non-exclusive inclusion, so that a process, method, article, or device that includes a series of elements includes not only those elements, but also those not explicitly listed, or other elements that are inherent to this process, method, article, or device. Without more restrictions, the element defined by the sentence "include a . . . " does not exclude that there are other identical elements included in the process, method, article or device that includes the element.

According to the embodiments of the present invention described above, these embodiments do not describe all the details, nor limit the invention to the specific embodiments described. Obviously, according to the above description, many modifications and changes can be made. This specification selects and specifically describes these embodiments in order to better explain the principles and practical applications of the present invention, so that those skilled in the art can make good use of the present invention and make modifications and uses based on the present invention. The invention is only limited by the claims, their full scope and equivalents.

INDUSTRIAL APPLICABILITY

The identification method, touch control unit, touch panel and touch system of the active capacitive stylus provided by the embodiments of the present invention can accurately identify the specific positions of multiple active capacitive styluses by eliminating the coordinates of the ghost points, and has the advantages of high positioning accuracy and strong user experience.

What is claimed is:

1. A method for recognizing multiple active capacitive styluses, wherein the method comprises the steps of:
    obtaining recognition signals sent by multiple active capacitive styluses, and recognizing coordinates of each active capacitive stylus and its report point;
    removing ghost point coordinates from the report point coordinates in a mutual capacitive mode of a work cycle of a touch panel, to obtain actual coordinates of each active capacitive stylus.

2. The method for recognizing multiple active capacitive styluses of claim 1, wherein the recognition signals sent by the multiple active capacitive styluses are obtained by controlling a transmit electrode or a receive electrode of the touch panel.

3. The method for recognizing multiple active capacitive styluses of claim 1, wherein before the step of removing the ghost point coordinates from the report point coordinates in the mutual capacitive mode of the work cycle of the touch panel, to obtain the actual coordinates of each active capacitive stylus, the method further comprises:
    enabling the mutual capacitive mode of the touch panel.

4. The method for recognizing multiple active capacitive styluses of claim 1, wherein after the step of removing the ghost point coordinates from the report point coordinates in the mutual capacitive mode of the work cycle of the touch panel, to obtain the actual coordinates of each active capacitive stylus, the method further comprises:
    reporting the actual coordinates of each active capacitive stylus.

* * * * *